US012283401B2

(12) United States Patent
Said et al.

(10) Patent No.: US 12,283,401 B2
(45) Date of Patent: *Apr. 22, 2025

(54) MAGNET WIRE WITH THERMOPLASTIC INSULATION

(71) Applicant: Essex Furukawa Magnet Wire USA LLC

(72) Inventors: Mohammad Mazhar Said, South Barrington, IL (US); Matthew E. Leach, Fort Wayne, IN (US)

(73) Assignee: Essex Solutions USA LLC, Atlanta, GA (US)

( * ) Notice: Subject to any disclaimer, the term of this patent is extended or adjusted under 35 U.S.C. 154(b) by 50 days.

This patent is subject to a terminal disclaimer.

(21) Appl. No.: 17/986,520

(22) Filed: Nov. 14, 2022

(65) Prior Publication Data

US 2023/0083970 A1   Mar. 16, 2023

Related U.S. Application Data

(63) Continuation-in-part of application No. 16/831,141, filed on Mar. 26, 2020, now Pat. No. 11,615,914.

(Continued)

(51) Int. Cl.
*H01B 3/42*  (2006.01)
*H01B 3/30*  (2006.01)
(Continued)

(52) U.S. Cl.
CPC ............ *H01B 3/427* (2013.01); *H01B 3/301* (2013.01); *H01B 7/0275* (2013.01); *H02K 3/30* (2013.01)

(58) Field of Classification Search
CPC ...... H01B 3/427; H01B 3/301; H01B 7/0275; H02K 3/30; H01F 27/32; H01F 27/2823
See application file for complete search history.

(56) References Cited

U.S. PATENT DOCUMENTS 11,615,914 B2 *   3/2023   Said .................. C08L 71/00
                                                              336/222
2003/0222340 A1 *  12/2003  Kondo ............... H05K 3/4632
                                                              257/E23.06

(Continued)

FOREIGN PATENT DOCUMENTS

CN        102844822      12/2012
CN        103578618       2/2014
(Continued)

OTHER PUBLICATIONS

European Search Report mailed Sep. 30, 2022 for Application No. PCT/US2020/024952.

(Continued)

*Primary Examiner* — Michael P McFadden
(74) *Attorney, Agent, or Firm* — Rhett White (57) ABSTRACT

Magnet wire including extruded insulation formed from a blend of different polymeric materials is described. A magnet wire may include a conductor and insulation formed around the conductor. The insulation may include at least one layer of extruded insulation formed from a blend of at least three different polymeric materials. A first polymeric material, such as polyetheretherketone, may have a thermal index above 250° C. Second and third polymeric materials, such as polyphenylsulfone and polyethersulfone, may have lower thermal indexes.

25 Claims, 4 Drawing Sheets

Related U.S. Application Data (60) Provisional application No. 62/826,605, filed on Mar. 29, 2019.

(51) Int. Cl.
  *H01B 7/02* (2006.01)
  *H02K 3/30* (2006.01)

(56) References Cited

U.S. PATENT DOCUMENTS

| | | | |
|---|---|---|---|
| 2005/0016658 A1* | 1/2005 | Asokan | H02K 3/32 156/53 |
| 2006/0057380 A1 | 3/2006 | Weinberg et al. | |
| 2006/0199906 A1* | 9/2006 | Walton | C08F 10/14 525/191 |
| 2012/0279752 A1 | 11/2012 | Oya et al. | |
| 2012/0285724 A1* | 11/2012 | Oya | H01B 3/427 174/120 C |
| 2015/0221412 A1 | 8/2015 | Caudill et al. | |
| 2015/0225522 A1 | 8/2015 | Khan et al. | |
| 2015/0243410 A1* | 8/2015 | Knerr | H02K 3/32 310/198 |
| 2015/0357084 A1* | 12/2015 | Masuda | H01B 3/301 428/379 |
| 2016/0189824 A1* | 6/2016 | Fukuda | H01B 3/308 427/117 |
| 2016/0196912 A1 | 7/2016 | Sanner et al. | |
| 2017/0178765 A1 | 6/2017 | Ikeda et al. | |
| 2017/0178766 A1 | 6/2017 | Saito et al. | |
| 2018/0375396 A1* | 12/2018 | Ikeda | H02K 15/105 |
| 2019/0136057 A1 | 5/2019 | Jeol et al. | |
| 2020/0395145 A1 | 12/2020 | Knerr | |
| 2021/0122124 A1* | 4/2021 | Tsotsis | B29C 66/43441 |
| 2021/0261817 A1 | 8/2021 | Knerr et al. | |

FOREIGN PATENT DOCUMENTS

| | | |
|---|---|---|
| CN | 109659078 | 4/2019 |
| CN | 112424879 | 2/2021 |
| CN | 112491182 | 3/2021 |
| EP | 0323142 | 7/1989 |
| EP | 3193338 | 7/2017 |
| EP | 3193339 | 7/2017 |
| JP | 05225832 | 9/1993 |
| JP | 2010123390 A | 6/2010 |
| JP | 2015138626 | 7/2015 |
| WO | 2014/072447 | 5/2014 |
| WO | 2018141527 | 8/2018 |
| WO | 2019/018214 | 1/2019 |
| WO | 2020/058790 | 3/2020 |

OTHER PUBLICATIONS

International Search Report and Written Opinion in PCT/US2020/024952 mailed Jun. 24, 2020. 15 pages.

Chen, J et al. "Structures and Mechanical Properties of PEEK/PEI/PES Plastics Alloys Blent by Extrusion Molding Used for Cable Insulating Jacketing" Procedia Engineering; Publication [online]. May 20, 2012 [retrieved May 27, 2020]. Retrieved from the Internet: < URL: https://www.sciencedirect.com/science/article/pii/S18777058120154337via%3Dihub>.

* cited by examiner

MAGNET WIRE WITH THERMOPLASTIC INSULATION

CROSS-REFERENCE TO RELATED APPLICATION

This application is a continuation-in part of U.S. patent application Ser. No. 16/831,141, filed Mar. 26, 2020 and entitled "Magnet Wire with Thermoplastic Insulation", which claims priority to U.S. Provisional Application No. 62/826,605, filed Mar. 29, 2019 and entitled "Magnet Wire with Thermoplastic Insulation". The contents of each of prior application is incorporated by reference herein in its entirety.

TECHNICAL FIELD

Embodiments of the disclosure relate generally to magnet wire and, more particularly, to magnet wire that includes extruded insulation formed from a blend of thermoplastic materials.

BACKGROUND

Magnet wire, also referred to as winding wire or magnetic winding wire, is utilized in a wide variety of electric machines and devices, such as inverter drive motors, motor starter generators, transformers, etc. Typically, magnet wire is constructed by applying electrical insulation to a metallic conductor, such as a copper, aluminum, or alloy conductor. The insulation provides for electrical integrity and prevents shorts in the magnet wire. Conventional insulation often consists of polymeric enamel films that are applied in successive layers and baked in a furnace. In order to achieve higher dielectric strengths and partial discharge performance to satisfy increasing electrical performance criteria, it is typically necessary to apply a greater number of layers and, therefore, thicken the enamel. However, each successive pass through the baking furnace lowers the adhesive force between the enamel and the conductor, and it is difficult to build the enamel thickness beyond a certain point. Additionally, increased enamel layering may lead to solvent blisters or beading and/or reduced flexibility.

Recently, attempts have been made to form magnet wire insulation from extruded thermoplastic materials. The thermoplastic insulation is either extruded over a bare conductor or a conductor having enamel insulation. For example, U.S. Pat. No. 8,586,869 describes a magnet wire in which a polyphenylene sulfide ("PPS") resin is extruded over an enamel layer. As another example, U.S. Pat. No. 9,224,523 describes a magnet wire in which polyetheretherketone ("PEEK") is extruded over an enamel layer. Similarly, U.S. Pat. No. 9,324,476 describes a magnet wire in which either PEEK or polyaryletherketone is extruded over an enamel layer. The use of thermoplastic insulation can increase the partial discharge inception voltage ("PDIV"), dielectric breakdown strength, and other electrical properties of a magnet wire insulation system.

However, when relatively high-performance thermoplastic resins are utilized, an adhesive layer is often required between the thermoplastic insulation and an underlying enamel layer in order to provide proper interlayer adhesion. Additionally, these high-performance resins are expensive and increase the cost of the magnet wire relative to conventional insulation that utilizes all enamel. It is also possible to increase insulation performance beyond that provided by conventional thermoplastic resins. Accordingly, there is an opportunity for improved insulated magnet wire, and more particularly, improved magnet wire that includes thermoplastic insulation formed from various blends of two or more resins or materials. There is also an opportunity for magnet wire having blended thermoplastic insulation that provides improved dielectric breakdown, PDIV, cut through, thermal aging, concentricity, and/or physical properties relative to conventional magnet wire.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures. Additionally, the drawings are provided to illustrate example embodiments described herein and are not intended to limit the scope of the disclosure.

DETAILED DESCRIPTION

Various embodiments of the present disclosure are directed to magnet wire that includes thermoplastic insulation formed from a blend or mixture of two or more materials. In other words, a thermoplastic insulation layer may include at least a first polymeric material and a second polymeric material different from the first polymeric material. In certain embodiments, the thermoplastic insulation may be formed directly around a conductor. In other embodiments, one or more base insulation layers may be formed around a conductor, and the thermoplastic insulation may be formed around the base insulation layer(s). For example, one or more layers of polymeric enamel insulation may be formed around a conductor, and thermoplastic insulation may be formed around the enamel.

Other embodiments of the disclosure are directed to methods for forming magnet wire that includes thermoplastic insulation formed from a blend of two or more materials. A conductor and a blend of two or more different polymeric materials may be provided. At least one layer of a magnet wire insulation system may be formed by extruding the blend around the conductor. In certain embodiments, the blend may be extruded directly around the conductor. In other embodiments, the blend may be extruded around one or more base insulation layers, such as one or more layer of polymeric enamel.

A wide variety of suitable materials and/or combinations of materials may be incorporated in a polymeric blend as desired in various embodiments. Examples of suitable materials that may be included in a blend include, but are not limited to, polyetheretherketone ("PEEK"), polyetherketoneketone ("PEKK"), polyaryletherketone ("PAEK"), polyetherimide ("PEI"), polyphenylsulfone ("PPSU"), polyethersulfone ("PESU"), polyphenylene sulfide ("PPS"), polybenzimidazole ("PBI"), polycarbonate, one or more polyesters (e.g., polyethylene terephthalate ("PET"), etc.), one or more copolyesters, polyamide, and/or thermoplastic polyimide ("TPI"). Additionally, two or more polymeric materials may be blended or mixed together at any suitable blend rates or ratios. For example, each polymeric material may constitute between approximately 1.0% and approximately 99.0% by weight of a polymeric blend. In certain embodiments, each polymeric material may constitute between 5.0% and 95.0% by weight of the blend. In other embodiments, each polymeric material may constitute between 10.0% and 90.0% by weight of the blend. Polymeric materials and relative amounts of materials incorporated into a blend may be selected based on a wide variety of suitable factors including, but not limited to, costs of the materials, processing characteristics, desired dielectric breakdown, desired partial discharge inception voltage ("PDIV"), desired cut through, desired thermal aging properties, desired temperature rating, etc. A few example blends that may be utilized are described in greater detail herein.

In certain embodiments, a blend may be formed from at least three polymeric materials. For example, a blend may include a first polymeric material having a relatively high-performance, such as PEEK, PAEK, or PEKK. Additionally, the blend may include at least two other polymeric materials, such as PPSU as a second polymeric material and PESU as a third polymeric material. In other embodiments, a first polymeric material incorporated into a blend may be a relatively high-performance material having a thermal index greater than 250° C. Second and third polymeric materials may then each have a respective thermal index below 200° C.

The constituent components of a blend having at least three polymeric materials may be blended or mixed together with a wide variety of suitable blend ratios. In certain embodiments, a high-performance or first polymeric material (e.g., PEEK, PAEK, PEKK, etc.) may constitute a smaller portion of the blend by weight than the combined second and third polymeric materials. For example, the first polymeric material may constitute less than fifty percent (50%) by weight of a polymeric blend. In certain embodiments, the first polymeric material may constitute less than forty percent (40%) by weight of the polymeric blend. It was found that desired magnet wire insulation performance can be achieved by using relatively smaller amounts of a high-performance material in a blend. For example, extruded insulation formed from a blend that combines PEEK with two other materials (e.g., PPSU, PESU, etc.) may have an electrical performance (e.g., PDIV, dielectric breakdown, etc.) that is approximately equal to or better than extruded insulation formed solely from PEEK.

As desired in various embodiments, one or more additives may be incorporated into a polymeric blend. For example, in certain embodiments, one or more compatibilizers may be added to a polymeric blend in order to increase the stability of polymeric blend. In other embodiments, a stable polymeric blend may be formed without the use of any compatibilizers. As another example, one or more suitable filler materials may be added to a blend. Examples of suitable filler materials include, but are not limited to, inorganic materials such as metals, transition metals, lanthanides, actinides, metal oxides, and/or hydrated oxides of suitable materials such as aluminum, tin, boron, boron nitride, germanium, gallium, lead, silicon (e.g., silica dioxide, etc.), titanium (e.g., titanium(IV) oxide, etc.), chromium (e.g., chromium(III) oxide, etc.), zinc, yttrium, vanadium, zirconium, nickel, etc.; suitable organic materials such as polyaniline, polyacetylene, polyphenylene, polypyrrole, other electrically conductive particles; and/or any suitable combination of materials. In certain embodiments, the filler material(s) may enhance corona resistance and/or one or more thermal properties (e.g., temperature resistance, cut-through resistance, heat shock, etc.). The particles of a filler material may have any suitable dimensions, and any suitable blending ratio between filler material and polymeric materials may be utilized.

As a result of forming extruded insulation from a polymeric blend, the cost of a magnet wire may be reduced relative to conventional magnet wires that utilize certain high-performance thermoplastic polymers, such as PEEK. For example, a polymeric blend may provide similar performance (e.g., PDIV, dielectric breakdown, temperature rating, etc.) to PEEK (or another high-performance material) while having a lower overall material cost. Certain polymeric blends may provide improved electrical performance (e.g., dielectric breakdown, PDIV, etc.), temperature performance, and/or mechanical performance relative to conventional thermoplastic polymers, such as PEEK. Additionally, the use of a polymeric blend may reduce or eliminate a need for adhesive agents or promoters between extruded thermoplastic insulation and an underlying layer. In certain cases, polymeric blends may also provide for faster processing times.

Embodiments of the disclosure now will be described more fully hereinafter with reference to the accompanying drawings, in which certain embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
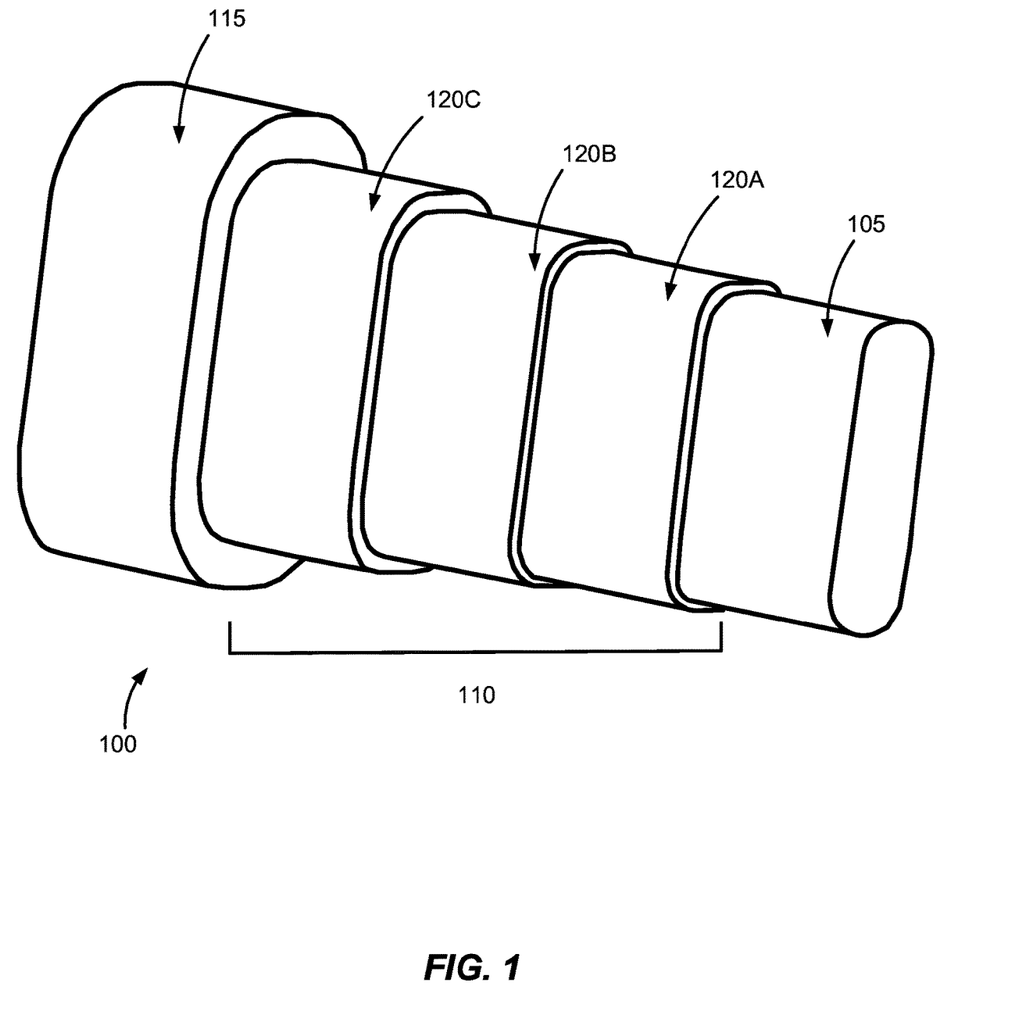
FIG. 1 is a perspective view of an example magnet wire that includes at least one extruded insulation layer, according to an illustrative embodiment of the disclosure.

With reference to FIG. 1, a perspective view of an example magnet wire 100 that includes extruded insulation is illustrated in accordance with an embodiment of the disclosure. The magnet wire 100 may include a central conductor 105, optional base insulation 110 formed around the central conductor 105, and extruded insulation 115 formed around the conductor 105 and any base insulation 110. As desired, the base insulation 110 may include any number of sublayers, such as the three sublayers 120A-C illustrated in FIG. 1.

Figure 2A:
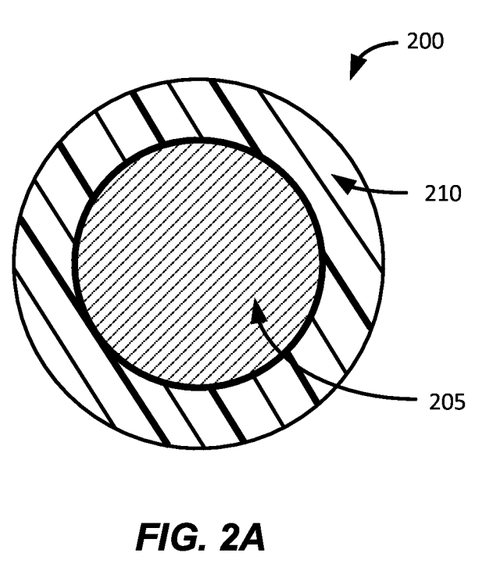
FIG. 2A-2D are cross-sectional views of example magnet wire constructions that include at least one extruded insulation layer, according to illustrative embodiments of the disclosure.
Figure 2B:
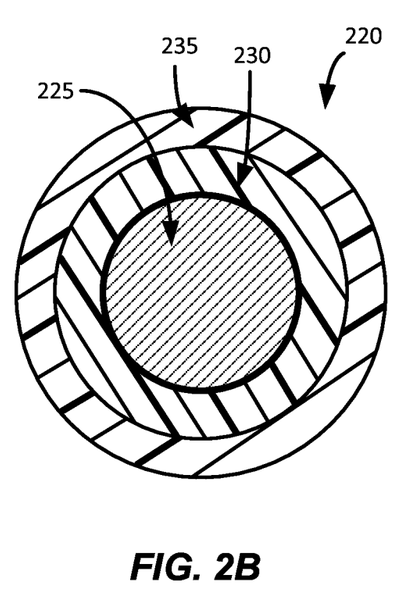
Figure 2C:
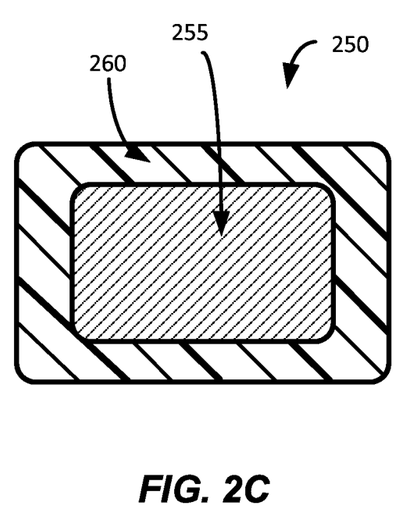
Figure 2D:
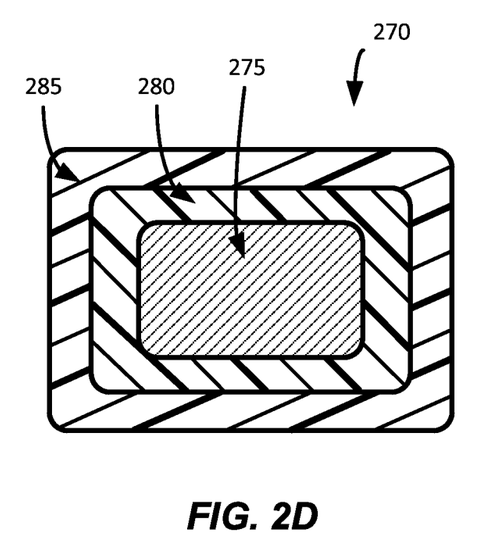

FIGS. 2A-2D are cross-sectional views of example magnet wire constructions 200, 220, 250, 270 that include at least one extruded insulation layer, according to illustrative embodiments of the disclosure. FIG. 2A illustrates an example magnet wire 200 having a round or circular cross-sectional shape in which extruded insulation 210 is formed around a conductor 205. FIG. 2B illustrates another example magnet wire 220 having a round cross-sectional shape. However, the magnet wire 220 of FIG. 2B includes a conductor 225, base insulation 230 formed around the conductor 225, and extruded insulation 235 formed around the base insulation 230. FIG. 2C illustrates an example magnet wire 250 having a rectangular cross-sectional shape in which extruded insulation 260 is formed around a conductor 255. FIG. 2D illustrates another example magnet wire 270 having a rectangular cross-sectional shape. However, similar to the magnet wire 100 of FIG. 1, the magnet wire 270 of FIG. 2D includes a conductor 275, base insulation 280 formed around the conductor 275, and extruded insulation 285 formed around the base insulation 280.

Each of the layers or components of the magnet wire 100 of FIG. 1 will now be described in greater detail. The example magnet wires 200, 220, 250, 270 of FIGS. 2A-2D may include layers or components similar to those described with reference to FIG. 1. Indeed, as desired in various embodiments, a magnet wire may be formed with a wide variety of suitable cross-sectional shapes and insulation configurations provided that the insulation includes an extruded insulation layer formed from a blend of polymeric materials. The example constructions illustrated in FIGS. 1-2D are provided by way of non-limiting example only.

Turning first to the conductor 105, the conductor 105 may be formed from a wide variety of suitable materials and/or combinations of materials. For example, the conductor 105 may be formed from copper, aluminum, annealed copper, oxygen-free copper, silver-plated copper, nickel plated copper, copper clad aluminum ("CCA"), silver, gold, a conductive alloy, a bimetal, carbon nanotubes, or any other suitable electrically conductive material. Additionally, the conductor 105 may be formed with any suitable cross-sectional shape. As shown, the conductor 105 may have a rectangular cross-sectional shape. In other embodiments, such as those illustrated in FIGS. 2A and 2B, a conductor 105 may have a circular or round cross-sectional shape. In yet other embodiments, a conductor may be formed with a square shape, an elliptical or oval shape, or any other suitable cross-sectional shape. Additionally, as desired for certain cross-sectional shapes such as the illustrated rectangular shape, a conductor may have corners that are rounded, sharp, smoothed, curved, angled, truncated, or otherwise formed.

The conductor 105 may be formed with any suitable dimensions, such as any suitable gauge, diameter, height, width, cross-sectional area, etc. As one non-limiting example, the longer sides of a rectangular conductor 105 may be between approximately 0.020 inches (508 µm) and approximately 0.750 inches (19050 µm), and the shorter sides may be between approximately 0.020 inches (508 µm) and approximately 0.400 inches (10160 µm). An example square conductor may have sides between approximately 0.020 inches (508 µm) and approximately 0.500 inches (12700 µm). An example round conductor may have a diameter between approximately 0.010 inches (254 µm) and approximately 0.500 inches (12700 µm). Other suitable dimensions may be utilized as desired.

A wide variety of suitable methods and/or techniques may be utilized to form, produce, or otherwise provide a conductor 105. In certain embodiments, a conductor 105 may be formed by drawing input material (e.g., a larger conductor, etc.) with one or more dies in order to reduce the size of the input material to desired dimensions. As desired, one or more flatteners and/or rollers may be used to modify the cross-sectional shape of the input material before and/or after drawing the input material through any of the dies. In certain embodiments, the conductor 105 may be formed in tandem with the application of a portion or all of the insulation system. In other words, conductor formation and application of insulation material may be conducted in tandem. In other embodiments, a conductor 105 with desired dimensions may be preformed or obtained from an external source. Insulation material may then be applied or otherwise formed on the conductor 105.

In certain embodiments, base insulation 110 may be formed on the conductor 105 prior to application of the extruded insulation 115. In other words, the base insulation 110 may be formed as first insulation, and extruded insulation 115 may be formed as second insulation over the base insulation 110. A wide variety of suitable materials may be utilized as desired to form base insulation 110. For example, the base insulation 110 may include one or more layers of polymeric enamel, one or more semi-conductive layers, and/or one or more tape or wrap layers. In certain embodiments, the base insulation 110 may be formed directly on the conductor 105, for example, around an outer periphery of the conductor 105. Additionally, as desired, the base insulation 110 may include a single layer of insulation material or a plurality of sublayers of insulation material, such as sublayers 120A-C.

In the event base insulation 110 is formed with a plurality of sublayers, any number of sublayers may be utilized. In certain embodiments, the sublayers may be formed from the same substance or material. For example, the sublayers may be formed as a plurality of enamel layers, and each enamel layer may be formed from the same polymeric material. In other embodiments, at least two of the sublayers may be formed from different materials. For example, different enamel layers may be formed from different polymeric materials. As another example, one or more sublayers may be formed from enamel while another sublayer is formed from a suitable tape or wrap.

In certain embodiments, the base insulation 110 may include one or more layers of enamel. An enamel layer is typically formed by applying a polymeric varnish to the conductor 105 and then baking the conductor 105 in a suitable enameling oven or furnace. The polymeric varnish typically includes thermoset polymeric solid material suspended in one or more solvents. Following application of the varnish, solvent is removed as a result of baking or other curing, thereby leaving a solid polymeric enamel layer. As desired, multiple layers of enamel may be applied to the conductor 105. For example, a first layer of enamel may be applied, and the conductor 105 may be passed through an enameling oven or other suitable curing device. A second layer of enamel may then be applied, and the conductor 105 may make another pass through the curing device (or a separate curing device). This process may be repeated until a desired number of enamel coats have been applied and/or until a desired enamel thickness or build has been achieved. As desired, an enameling oven may be configured to facilitate a wire 100 making multiple passes through the oven. Other curing devices that may be utilized in addition to or as an alternative to enameling ovens include, but are not limited to, infrared light systems, ultraviolet light systems, and/or electron beam systems.

Any number of enamel layers may be formed in various embodiments. Additionally, each layer of enamel and/or a total enamel build may have any desired thickness, such as a thickness of approximately 0.0002 (5 µm), 0.0005 (13 µm), 0.007 (18 µm), 0.001 (25 µm), 0.002 (51 µm), 0.003 (76 µm), 0.004 (102 µm), 0.005 (127 µm), 0.006 (152 µm), 0.007 (178 µm), 0.008 (204 µm), 0.009 (229 µm), 0.010 (254 µm), 0.012 (305 µm), 0.015 (381 µm), 0.017 (432 µm), or 0.020 inches (508 µm), a thickness included in a range between any two of the aforementioned values, or a thickness included in a range bounded on either a minimum or maximum end by one of the aforementioned values.

A wide variety of different types of polymeric materials may be utilized as desired to form an enamel layer. Examples of suitable materials include, but are not limited to, polyimide, polyamideimide, amideimide, polyester, polyesterimide, polysulfone, polyphenylenesulfone, polysulfide, polyphenylenesulfide, polyetherimide, polyamide, polyketones, etc. In certain embodiments, the base insulation 110 may include polyimide ("PI") and/or polyamide-imide ("PAI") enamel. For example, one or more layers of PI may be formed as base insulation 110, one or more layers of PAI may be formed as base insulation 110, or a combination of PI and PAI layers may be formed as base insulation 110.

As desired, one or more suitable filler materials may be incorporated into an enamel layer. Examples of suitable filler materials include, but are not limited to, inorganic materials such as metals, transition metals, lanthanides, actinides, metal oxides, and/or hydrated oxides of suitable materials such as aluminum, tin, boron, boron nitride, germanium, gallium, lead, silicon (e.g., silica dioxide, etc.), titanium (e.g., titanium(IV) oxide, etc.), chromium (e.g., chromium (III) oxide, etc.), zinc, yttrium, vanadium, zirconium, nickel, etc.; suitable organic materials such as polyaniline, polyacetylene, polyphenylene, polypyrrole, other electrically conductive particles; and/or any suitable combination of materials. In certain embodiments, the filler material(s) may enhance corona resistance and/or one or more thermal properties (e.g., temperature resistance, cut-through resistance, heat shock, etc.) of an enamel layer. The particles of a filler material may have any suitable dimensions, such as any suitable diameters. Further, any suitable blend or mixture ratio between filler material and the polymeric material of an enamel layer may be utilized.

As desired, other types of base insulation 110 may be utilized in addition to or as an alternative to enamel. In certain embodiments, the base insulation 110 may include one or more suitable wraps or tapes, such as a polymeric tape wrapped around the conductor 105 and/or any underlying layers. In other embodiments, the base insulation 110 may include one or more layers of extruded material. For example, the base insulation 110 may include one or more layers of extruded material that are not formed from a blend of two or more polymeric materials. The extruded insulation 115 may then be formed from a polymeric blend over the underlying extruded layer(s). As another example, the base insulation 110 may include one or more layers formed from a first polymeric blend containing two or more materials. The extruded insulation 115 may then be formed from a second polymeric blend containing two or more materials different than those of the first blend. The materials utilized to form base extruded insulation may be similar to those discussed below for the extruded insulation 115. Additionally, if a blend is used to form base insulation, the blend may be formed in a similar manner as that discussed for the extruded insulation 115.

In yet other embodiments, the base insulation 110 may include one or more semi-conductive layers of material. A semi-conductive layer may have a conductivity between that of a conductor 105 and that of an insulator. A semi-conductive layer may be formed from a wide variety of suitable materials and/or combinations of materials. For example, one or more suitable semi-conductive enamels, extruded semi-conductive materials, semi-conductive tapes, and/or semi-conductive wraps may be utilized. In certain embodiments, a semi-conductive layer may be formed from a material that combines one or more suitable filler materials with one or more base materials. For example, semi-conductive and/or conductive filler material (e.g., any of the filler materials discussed above, etc.) may be combined with one or more suitable base materials. Any suitable blend or mixture ratio between filler material and base material may be utilized. For example, the semi-conductive layer may include between approximately 3 percent and approximately 20 percent filler material(s) by weight, although other concentrations may be used (e.g., between approximately 5 percent and approximately 50 percent, between approximately 7 percent and approximately 40 percent, etc.). Additionally, a semi-conductive layer may have any suitable thickness.

As a result of incorporating one or more semi-conductive layers into a magnet wire 100, non-uniform electric, magnetic, and/or electromagnetic fields (hereinafter collectively referred to as electric fields) may be equalized or "smoothed out." For example, imperfections or discontinuities on the surface of a magnet wire conductor 105, such as burs (i.e., peaks), dents (i.e., valleys), slivers of conductive materials, foreign materials, etc., may be a source of local non-uniform electric fields. These non-uniform fields may electrically stress the insulation when the magnet wire 100 is energized. Subsequently, the local gradients of an electric field may lead to the premature deterioration of the insulation integrity and additionally may result in initiation and subsequent development of partial discharges, which may finally result in the full breakdown of the insulation. The addition of one or more semi-conductive layers may help to equalize or "smooth out" the non-uniform electric fields, thereby reducing local stress in the insulation. In other words, one or more semi-conductive layers may assist in equalizing voltage stresses in the insulation and/or dissipating corona discharges at or near the conductor 105 and/or at or near a surface of the magnet wire 100. The buffering and/or smoothing effects may be relatively higher for the insulating material and/or insulating layers positioned closest to a semi-conductive layer(s) (e.g., the innermost insulating layers if a semi-conductive layer is formed directed on the conductor 105). As a result of the buffering or smoothing, the electrical performance of the magnet wire 100 may be improved. For example, the breakdown voltage and/or the partial discharge inception voltage ("PDIV") of the magnet wire 100 may be improved. As another example, the long-term performance of the insulation may be enhanced, as the one or more semi-conductive layers may "neutralize" the sources for the creation of high gradient local electric fields and subsequently slow down the aging process of the insulation and extend the life expectancy of the magnet wire 100.

With continued reference to FIG. 1, extruded insulation 115 may be formed around the conductor 105. In certain embodiments, such as the embodiments illustrated in FIGS. 2A and 2D, the extruded insulation 115 may be formed directly around the conductor 105 without any intervening insulation layers. In other embodiments, such as the embodiments illustrated in FIGS. 1, 2B and 2D, the extruded insulation 115 may be formed over base insulation 110 (e.g., polymeric enamel, etc.). According to an aspect of the disclosure, the extruded insulation 115 may be formed with one or more layers of thermoplastic insulation that includes a blend or mixture of two or more materials. In other words, extruded thermoplastic insulation 115 may include at least a first polymeric material and a second polymeric material different from the first polymeric material.

A wide variety of suitable materials and/or combinations of materials may be incorporated in a polymeric blend utilized to form extruded insulation 115. Examples of suitable materials that may be included in a polymeric blend include, but are not limited to, polyetheretherketone ("PEEK"), polyetherketoneketone ("PEKK"), polyetheretherketoneketone ("PEEKK"), polyetherketone ("PEK"), polyaryletherketone ("PAEK"), other suitable polymers that include at least one ketone group, polyetherimide ("PEI")

such as Ultem® marketed by Sabic Global Technologies, polyphenylsulfone ("PPSU") such as Radel® marketed by Solvay Specialty Polymers USA, polyethersulfone ("PESU"), polyphenylene sulfide ("PPS"), polybenzimidazole ("PBI"), polycarbonate, one or more polyesters (e.g., polyethylene terephthalate ("PET"), etc.), one or more copolyesters, polyamide, and/or thermoplastic polyimide ("TPI").

In certain embodiments, a first polymeric material included in a blend may be or may include one of polyetheretherketone, polyaryletherketone, polyetherketoneketone, polyphenylsulfone, polyphenylene sulfide, or polybenzimidazole. A second polymeric material included in the blend may be or may include one of polyphenylsulfone, polyetherimide, polyethersulfone, polyphenylene sulfide, polycarbonate, or polyester. In other embodiments, a polymeric blend may include at least two materials selected from a group consisting of polyetheretherketone, polyaryletherketone, polyetherketoneketone, polyphenylsulfone, polyphenylene sulfide, polybenzimidazole, polyethersulfone, polycarbonate, and polyester.

Additionally, two or more polymeric materials may be blended or mixed together at any suitable blend rates or ratios within a polymeric blend. For example, each polymeric material may constitute between approximately 1.0% and approximately 99% by weight of a polymeric blend. In certain embodiments, each polymeric material incorporated into a blend (e.g., a first polymeric material, a second polymeric material, etc.) may constitute approximately 5, 10, 15, 20, 25, 30, 40, 45, 50, 60, 70, 75, 80, 90, or 95% by weight of the blend, a weight percentage included in a range between any two of the above values (e.g., between approximately 5 and 95%, between approximately 10 and 90%, etc.), or a weight percentage included in a range bounded on either a minimum or maximum end by one of the above values (e.g., at least 5%, at least 10%, no more than 95%, no more than 90%, etc.).

Polymeric materials and relative amounts of materials incorporated into a blend may be selected based on a wide variety of suitable factors including, but not limited to, costs of the materials, processing characteristics, desired dielectric breakdown, desired partial discharge inception voltage ("PDIV"), desired cut through, desired thermal aging properties, desired temperature rating, desired crystallinity, etc. A few example blends that may be utilized are described in greater detail below. Additionally, in certain embodiments, a blend may include a first polymeric material that is a semi-crystalline material (e.g., PEEK, PPS, etc.) and a second polymeric material that is an amorphous material (e.g., PPSU, etc.). Combination of a semi-crystalline and an amorphous material is one method that permits a desired crystallinity of a blend to be achieved. In certain embodiments, a blend may be formed with any suitable crystallinity, such as a crystallinity of at least approximately 25%, a crystallinity of at least approximately 30%, etc. Additionally, in certain embodiments, the use of a polymeric blend may increase the glass transition temperature of the blend relative to certain costly single polymeric materials.

In certain embodiments, a polymeric blend may include a combination of PESU and PPSU. For example, a polymeric blend may include approximately 90% by weight of PESU and approximately 10% by weight of PPSU. As another example, a polymeric blend may include approximately 70% by weight of PESU and approximately 30% by weight of PPSU. As yet another example, a polymeric blend may include approximately 50% by weight of PESU and approximately 50% by weight of PPSU. In other embodiments, a polymeric blend may include approximately 5, 10, 20, 25, 30, 40, 50, 60, 70, 80, 90, or 95% by weight of PESU, an amount of PESU included in a range between any two of the above values (e.g., between 5 and 95%, between 10 and 90%, etc.), or an amount of PESU included in a range bounded on either a minimum or maximum end by one of the above values (e.g., at least 5%, at least 10%, etc.). Additionally, the polymeric blend may include approximately 5, 10, 20, 25, 30, 40, 50, 60, 70, 80, 90, or 95% by weight of PPSU, an amount of PPSU included in a range between any two of the above values (e.g., between 5 and 95%, between 10 and 90%, etc.), or an amount of PPSU included in a range bounded on either a minimum or maximum end by one of the above values (e.g., at least 5%, at least 10%, etc.). Indeed, a wide variety of suitable blend ratios between PESU and PPSU may be utilized as desired.

In other embodiments, a polymeric blend may include a combination of PEI and PEEK. For example, a polymeric blend may include approximately 90% by weight of PEI and approximately 10% by weight of PEEK. As another example, a polymeric blend may include approximately 70% by weight of PEI and approximately 30% by weight of PEEK. As yet another example, a polymeric blend may include approximately 50% by weight of PEI and approximately 50% by weight of PEEK. In other embodiments, a polymeric blend may include approximately 5, 10, 20, 25, 30, 40, 50, 60, 70, 80, 90, or 95% by weight of PEI, an amount of PEI included in a range between any two of the above values (between 5 and 95%, between 10 and 90%, etc.), or an amount of PEI included in a range bounded on either a minimum or maximum end by one of the above values (at least 5%, at least 10%, etc.). Additionally, the polymeric blend may include approximately 5, 10, 20, 25, 30, 40, 50, 60, 70, 80, 90, or 95% by weight of PEEK, an amount of PEEK included in a range between any two of the above values (e.g., between 5 and 95%, between 10 and 90%, etc.), or an amount of PEEK included in a range bounded on either a minimum or maximum end by one of the above values (e.g., at least 5%, at least 10%, etc.). Indeed, a wide variety of suitable blend ratios between PEI and PEEK may be utilized as desired.

In other embodiments, a polymeric blend may include a combination of PPSU and PEI. For example, a polymeric blend may include approximately 90% by weight of PPSU and approximately 10% by weight of PEI. As another example, a polymeric blend may include approximately 70% by weight of PPSU and approximately 30% by weight of PEI. As yet another example, a polymeric blend may include approximately 50% by weight of PPSU and approximately 50% by weight of PEI. In other embodiments, a polymeric blend may include approximately 5, 10, 20, 25, 30, 40, 50, 60, 70, 80, 90, or 95% by weight of PPSU, an amount of PPSU included in a range between any two of the above values (e.g., between 5 and 95%, between 10 and 90%, etc.), or an amount of PPSU included in a range bounded on either a minimum or maximum end by one of the above values (at least 5%, at least 10%, etc.). Additionally, the polymeric blend may include approximately 5, 10, 20, 25, 30, 40, 50, 60, 70, 80, 90, or 95% by weight of PEI, an amount of PEI included in a range between any two of the above values (e.g., between 5 and 95%, between 10 and 90%, etc.), or an amount of PEI included in a range bounded on either a minimum or maximum end by one of the above values (e.g., at least 5%, at least 10%, etc.). Indeed, a wide variety of suitable blend ratios between PPSU and PEI may be utilized as desired.

In other embodiments, a polymeric blend may include a combination of PPSU and PEEK. For example, a polymeric blend may include approximately 90% by weight of PPSU and approximately 10% by weight of PEEK. As another example, a polymeric blend may include approximately 70% by weight of PPSU and approximately 30% by weight of PEEK. As yet another example, a polymeric blend may include approximately 50% by weight of PPSU and approximately 50% by weight of PEEK. In other embodiments, a polymeric blend may include approximately 5, 10, 20, 25, 30, 40, 50, 60, 70, 80, 90, or 95% by weight of PPSU, an amount of PPSU included in a range between any two of the above values (e.g., between 5 and 95%, between 10 and 90%, etc.), or an amount of PPSU included in a range bounded on either a minimum or maximum end by one of the above values (e.g., at least 5%, at least 10%, etc.). Additionally, the polymeric blend may include approximately 5, 10, 20, 25, 30, 40, 50, 60, 70, 80, 90, or 95% by weight of PEEK, an amount of PEEK included in a range between any two of the above values (e.g., between 5 and 95%, between 10 and 90%, etc.), or an amount of PEEK included in a range bounded on either a minimum or maximum end by one of the above values (e.g., at least 5%, at least 10%, etc.). Indeed, a wide variety of suitable blend ratios between PPSU and PEEK may be utilized as desired.

A wide variety of other suitable combinations of thermoplastic and/or other polymeric materials may be utilized to form polymeric blends. The polymeric blends discussed above are provided by way of non-limiting example only. Other blends may include other combinations and blend ratios of polymeric materials. For example, blends may include any combinations of the polymeric materials described herein at any of the described ratios and/or weight percentages. For example, a relatively low-cost polymeric blend may be formed by combining polycarbonate and polyester.

Additionally, although the blends discussed above describe a mixture of two polymeric materials, other polymeric blends may include three or more polymeric materials combined at any suitable blend ratios. Any of the materials discussed herein may be utilized for a triple polymeric blend or for a blend with more than three polymeric components. A few example triple blends that may be utilized in various embodiments include, but are not limited to, a blend of PEEK, PPSU, and PESU, a blend of PEEK, PPSU, and PPS, a blend of PAEK, PESU, and PPSU, a blend of PAEK, PESU, and PPS, a blend of PEEK, PEI, and PPSU, a blend of PEEK, PEI, and PESU, and a blend of PEEK, PEI, and PPS. Any suitable blend ratios may be utilized in these blends. For example, the polymeric materials may be combined such that each material constitutes between 5 and 90% by weight of the blend or such that each material constitutes between 10 and 80% by weight of the blend. For example, each polymeric material may constitute approximately 5, 10, 15, 20, 25, 30, 35, 40, 45, 50, 55, 60, 65, 70, 75, 80, 85, or 90% by weight of the blend, a weight percentage included in a range between any two of the above values, or a weight percentage included in a range bounded on either the minimum or maximum end by one of the above values.

In certain embodiments, a blend formed from at least three polymeric materials may include a first polymeric material having a relatively high-performance, such as PEEK, PAEK, or PEKK. Additionally, the blend may include at least two other polymeric materials, such as PPSU as a second polymeric material and PESU as a third polymeric material. For example, a blend of PEEK, PPSU, and PESU may be utilized. As another example, a blend of PAEK, PPSU, and PESU may be utilized. As yet another example, a blend of PEKK, PPSU, and PESU may be utilized. In other embodiments, a blend may include PEEK, PAEK, or PEKK as a first polymeric material, PPSU as a second polymeric material, and a different material (e.g., PESU, PEI, PPS, etc.) as a third polymeric material.

In other embodiments, a first polymeric material incorporated into a blend may be a relatively high-performance material having a thermal index greater than 250° C. (e.g., PEEK, PAEK, PEKK, etc.). Second and third polymeric materials (e.g., PPSU, PESU, etc.) may then each have a respective thermal index below 200° C. The thermal index of a material utilized to form magnet wire insulation is generally defined as a number in degrees Celsius that compares the temperature vs. time characteristics of the material. It may be obtained by extrapolating the Arrhenius plot of life versus temperature to a specified time, usually 20,000 hours. One test for measuring or determining the thermal index or thermal endurance of a magnet wire insulation material is the ASTM D2307 test set forth by ASTM International. A thermal class generally specifies a range of thermal indexes established by a standards body, such as the National Electrical Manufacturers Association ("NEMA") or UL. For example, a 220 class material may have a thermal index between 220° C. and 239° C. while a 240 class material has a thermal index between 240° C. and another threshold value.

The constituent components of a blend having at least three polymeric materials may be blended or mixed together with a wide variety of suitable blend ratios. In certain embodiments, a high-performance or first polymeric material (e.g., PEEK, PAEK, PEKK, etc.) may constitute a smaller portion of the blend by weight than the combined total of the second and third polymeric materials. For example, the first polymeric material may constitute less than fifty percent (50%) by weight of a polymeric blend. In certain embodiments, the first polymeric material may constitute less than forty percent (40%) by weight of the polymeric blend. In various embodiments, the first polymeric material may constitute approximately 20, 25, 30, 35, 40, or 45 percent by weight of a blend, a percentage included in a range between any two of the previously listed values, or a percentage included in a range bounded on a maximum end by one of the above values. It was found that desired magnet wire insulation performance can be achieved by using relatively smaller amounts of a high-performance material in a blend. For example, extruded insulation formed from a blend that combines PEEK with two other materials (e.g., PPSU, PESU, etc.) may have an electrical performance (e.g., PDIV, dielectric breakdown, etc.) that is approximately equal to or better than extruded insulation formed solely from PEEK.

In certain embodiments, a polymeric blend may include between twenty percent (20%) and forty percent (40%) by weight of a first polymeric material, such as PEEK, PAEK, PEKK, or a material having a thermal index above 250° C. The polymeric blend may additionally include between thirty percent (30%) and seventy percent (70%) by weight of a second polymeric material, such as PPSU or another material having a thermal index below 200° C. A third polymeric material, such as PESU or another material having a thermal index below 200° C., may then constitute between ten percent (10%) and forty percent (40%) by weight of the blend In other embodiments, the first polymeric material may constitute between twenty-five percent (25%) and thirty-five percent (35%) by weight of the blend, the second polymeric material may constitute between forty-five percent (45%) and fifty-five percent (55%) by weight of the blend, and the third polymeric material may constitute between fifteen percent (15%) and twenty-five percent (25%) by weight of the blend.

Regardless of whether a polymeric blend include two, three, or more components, in certain embodiments, a blend may be formed without the addition or use of compatibilizers. Certain polymeric blends remain stable even without compatibilizers, are partially miscible, and do not affect physical properties of the polymeric materials. By contrast, conventional teachings indicate that compatibilizers are desirable. In other embodiments, one or more compatibilizers may be added to a polymeric blend as additives in order to increase the stability of the polymeric blend. Examples of suitable compatibilizers include, but are not limited to, silanes, titanates, zirconates, polyetherimide, epoxy cresol novolac resin, metal carbonates (e.g., potassium carbonate, cesium carbonate, lithium carbonate, etc.), magnesium peroxide, sulfur, and/or maleic anhydride. One or more compatibilizers may be added at any suitable ratio or weight percentage. For example, one or more compatibilizers may constitute between approximately 0.1% and approximately 30% by weight of a polymeric blend. In various embodiments, one or more compatibilizers may constitute approximately 0.1, 0.2, 0.25, 0.3, 0.4, 0.5, 0.75, 1.0, 2.0, 2.5, 5.0, 7.5, 10.0, 12.5, 15.0, 17.5, 20.0, 22.5, 25.0, 27.5, or 30.0% by weight of a polymeric blend, a weight percentage included in a range between any two of the above values, or a weight percentage included in a range bounded on either the minimum or maximum end by one of the above values.

A wide variety of other suitable filler materials may be added to a polymeric blend as desired in various embodiments of the disclosure. Examples of suitable filler materials include, but are not limited to, inorganic materials such as metals, transition metals, lanthanides, actinides, metal oxides, and/or hydrated oxides of suitable materials such as aluminum, tin, boron, boron nitride, germanium, gallium, lead, silicon (e.g., silica dioxide, etc.), titanium (e.g., titanium(IV) oxide, etc.), chromium (e.g., chromium(III) oxide, etc.), zinc, yttrium, vanadium, zirconium, nickel, etc. (e.g., titanium dioxide, boron nitride, silica dioxide, etc.); suitable organic materials such as polyaniline, polyacetylene, polyphenylene, polypyrrole, other electrically conductive particles; and/or any suitable combination of materials. In certain embodiments, the filler material(s) may enhance corona resistance and/or one or more thermal properties (e.g., temperature resistance, cut-through resistance, heat shock, etc.). The particles of a filler material may have any suitable dimensions, such as any suitable diameters. In certain embodiments, a filler material may include nanoparticles. Further, any suitable blend or mixture ratio between filler material and polymeric materials may be utilized.

An extrusion process may result in the formation of an insulation layer from approximately 100% solid material. In other words, the extruded insulation 115 may be free or substantially free of any solvents. As a result, the application of the extruded insulation 115 may be less energy intensive than the application of an enamel layer as there is no need to evaporate solvents. In certain embodiments, the extruded insulation 115 may be formed as a single layer. In other words, a single polymeric extrusion step may be performed during formation of the extruded insulation 115. In other embodiments, the extruded insulation 115 may be formed via a plurality of extrusion steps. In other words, the extruded insulation 115 may be formed from a plurality of sublayers. If the extruded insulation 115 includes sublayers, the sublayers may be formed from the same material or, alternatively, at least two layers may be formed from different materials. For example, a first extruded layer may include a first polymeric material or polymeric blend while a second extruded layer includes a second polymeric material or polymeric blend. Indeed, a wide variety of different materials and/or combinations of materials may be utilized to form extruded insulation layers.

The extruded insulation 115 may be formed with any suitable thickness as desired. For example, the extruded insulation may be formed with a thickness between approximately 0.001 inches (25 µm) and approximately 0.024 inches (610 µm). In various embodiments, the extruded insulation may have a thickness of approximately 0.001 inches (25 µm), 0.002 inches (51 µm), 0.003 inches (76 µm), 0.004 inches (102 µm), 0.005 inches (127 µm), 0.006 inches (152 µm), 0.007 inches (178 µm), 0.008 inches (203 µm), 0.009 inches (229 µm), 0.010 inches (254 µm), 0.012 inches (305 µm), 0.015 inches (381 µm), 0.017 inches (432 µm), 0.020 inches (508 µm), 0.022 inches (559 µm), or 0.024 inches (610 µm), a thickness included in a range between any two of the aforementioned values (e.g., a thickness between 0.003 inches and 0.010 inches, etc.), or a thickness included in a range bounded on either a minimum or maximum end by one of the aforementioned values (e.g., a thickness of approximately 0.02 inches or less, etc.). These example thicknesses allow the extruded insulation 115 to be thin enough to allow a relatively tight packing of the resulting magnet wire 100. Additionally, in certain embodiments, the extruded insulation 115 may be formed to have a cross-sectional shape similar to that of the underlying conductor 105 and/or the base insulation 110. For example, if the conductor 105 has a rectangular cross-sectional shape, the extruded insulation 115 may be formed to have a rectangular cross-sectional shape. In other embodiments, the extruded insulation 115 may be formed with a cross-sectional shape that varies from that of the underlying conductor 105 (and/or the underlying base insulation 110). As one non-limiting example, the conductor 105 may be formed with an elliptical cross-sectional shape while the extruded layer 115 is formed with a rectangular cross-sectional shape. A wide variety of other suitable configurations will be appreciated.

In certain embodiments, an extrusion process may be controlled such that the extruded insulation 115 has a relatively uniform thickness along a longitudinal length of the magnet wire 100. In other words, the extruded insulation 115 may be formed with a concentricity that is approximately close to 1.0. The concentricity of the extruded insulation 115 is the ratio of the thickness of the extruded insulation 115 to the thinness of the extruded insulation 115 at any given cross-sectional point along a longitudinal length of the magnet wire 100. In certain embodiments the extruded insulation 115 may be formed with a concentricity between approximately 1.0 and 1.8. For example, the extruded insulation 115 may be formed with a concentricity of approximately 1.05, 1.1, 1.15, 1.2, 1.25, 1.3, 1.35, 1.4, 1.45, 1.5, 1.6, 1.7, 1.75, 1.8, a concentricity between any two of the above values, or a concentricity bounded on a maximum end by one of the above values (e.g., a concentricity of approximately 1.1 or less, a concentricity of approximately 1.3 or less, etc.).

Similar to the extruded insulation 115, application of one or more other insulation layers (e.g., a layer of base insulation 110, etc.) may also be controlled to result in a desired concentricity. For example, any insulation layer may have a concentricity between approximately 1.0 and 1.8. In certain embodiments, an insulation layer may have a concentricity similar to any of the example concentricities discussed above for the extruded insulation 115. Further, the combined insulation layers formed around a magnet wire may have any desired overall concentricity, such as any of the example concentricities discussed above with reference to the extruded insulation 115.

In certain embodiments, the extruded insulation 115 may be formed directly on the conductor 105 or the underlying base insulation 110. In other words, the extruded insulation 115 may be formed on an underlying layer without the use of a bonding agent, adhesion promoter, or adhesive layer. For example, the extruded insulation 115 may be formed from a blend of polymeric materials that provides improved adhesion relative to conventional unblended single materials. As another example, the temperature of the magnet wire 100 may be controlled prior to the application of the extruded insulation 115 to eliminate the need for an adhesive layer. As a result, the extruded insulation 115 may be bonded to an underlying layer without use of a separate adhesive. In other embodiments, one or more suitable bonding agents, adhesion promoters, or adhesive layers may be incorporated between the extruded insulation 115 and an underlying layer. A wide variety of suitable adhesion promoters may be utilized as desired.

In other embodiments, one or more suitable surface modification treatments may be utilized on a conductor 105 and/or any number of base insulation 110 layers to promote adhesion with a subsequently formed layer. For example, a surface of a conductor, enamel, or other layer may be modified by a suitable treatment in order to promote adhesion with a subsequently formed insulation layer (e.g., a subsequently formed enamel layer, an extruded layer, etc.). Examples of suitable surface modification treatments include, but are not limited to, a plasma treatment, an ultraviolet ("UV") treatment, a corona discharge treatment, and/or a gas flame treatment. A surface treatment may alter a topography of a conductor or insulation layer and/or form functional groups on the surface of the conductor or insulation layer that enhance or promote bonding of a subsequently formed insulation layer. As a result, surface treatments may reduce interlayer delamination.

As a result of forming extruded insulation 115 from a polymeric blend, the cost of a magnet wire 105 may be reduced relative to conventional magnet wires that exclusively utilize certain high-performance thermoplastic polymers, such as PEEK. Additionally, certain polymeric blends may provide similar performance (e.g., PDIV, dielectric breakdown, temperature rating, etc.) to extruded insulation formed solely from a high-performance polymer. As one non-limiting example, a polymeric blend containing PEEK blended with one or more lower cost polymeric materials (e.g., PPSU, PESU, PEI, etc.) may provide similar or better performance than PEEK while having an overall lower cost.

Indeed, certain polymeric blends may provide improved performance relative to certain unblended conventional polymers (e.g., PEEK, etc.). For example, a polymeric blend may provide improved electrical performance (e.g., dielectric breakdown, PDIV, etc.), temperature performance (e.g., thermal aging, cut through), and/or mechanical performance (e.g., bend test, concentricity, solvent resistance, fluid resistance, etc.) relative to conventional thermoplastic polymers utilized on magnet wire. The use of a polymeric blend may also reduce or eliminate a need for adhesive agents or promoters between extruded thermoplastic insulation 115 and an underlying layer. In certain cases, polymeric blends may also provide for faster processing times, lower processing temperatures, improved processing conditions, and/or improved physical and electrical properties.

As one example, a polymeric blend that combines PEEK (or another high-performance material) with two lower grade materials, such as PPSU and PESU, was found to have equivalent or better thermal properties than insulation formed solely from PEEK. As shown in Tables 1 and 2 below, the blend has a higher PDIV and dielectric strength than PEEK insulation. Further, the blend was found to exhibit better adhesion to an underlying layer (e.g., a conductor, base insulation etc.). The blend also has a lower viscosity during application, thereby making it easier to process and leading to improved concentricity of the formed extruded insulation layer.

Extruded insulation 115 formed with a polymeric blend and/or an insulation system that incorporates the extruded insulation 115 may have a wide variety of suitable electrical performance parameters, such as a wide variety of suitable PDIV values and/or dielectric strength or breakdown strength values. In certain embodiments, extruded insulation 115 and/or an insulation system incorporating the extruded insulation 115 may provide a PDIV value at 25° C. of at least approximately 1400, 1450, 1500, 1550, 1600, 1700, 1800, 1900, or 2000 volts, or a PDIV value included in a range between any two of the above values. Similar, in certain values, extruded insulation 115 and/or an insulation system incorporating the extruded insulation 115 may provide a dielectric strength value (e.g., a dielectric strength value measured by a suitable industry standard test such as a shotbox or foil test, etc.) of at least approximately, 12,000, 12,500, 13,000, 13,500, 14,000, 14,500, 15,000, 15,500, 16,000, 16,500, 17000, 17,500, 18,000, 19,000, 20,000, 21,000, or 22,000 volts, or a dielectric strength value included in a range between any two of the above values.

In certain embodiments, a polymeric blend may provide benefits as a result of incorporating two or more polymeric materials into the blend. For example, a first polymeric material may provide relatively high electrical performance while a second polymeric material may provide relatively high mechanical performance. A blend formed from the two or more polymeric materials may provide a combination of desirable electrical and mechanical performance. Other combinations of benefits may be achieved with different polymeric blends. Additionally, a mixture or blend rate of two or more polymeric materials may be based at least in part upon desired performance criteria provided by the polymeric blend. Indeed, polymeric materials incorporated into a blend may be selected and/or associated ratios of the materials may be selected in order to attain a wide variety of suitable electrical and/or mechanical performance properties including, but not limited to, PDIV values, dielectric strengths, cut through values, heat shock values, and/or oil resistance values. The magnet wires 100, 200, 220, 250, 270 described above with reference to FIGS. 1-2D are provided by way of example only. A wide variety of alternatives could be made to the illustrated magnet wires 100, 200, 220, 250, 270 as desired in various embodiments. For example, a wide variety of different types of insulation layers may be incorporated into a magnet wire in addition to extruded insulation formed from a polymeric blend. As another example, the cross-sectional shape of a magnet wire and/or one or more insulation layers may be altered. Indeed, the present disclosure envisions a wide variety of suitable magnet wire constructions.

A wide variety of suitable systems and/or methods may be utilized as desired to form extruded insulation on a magnet wire, such as any of the example magnet wires of FIGS.

Figure 3:
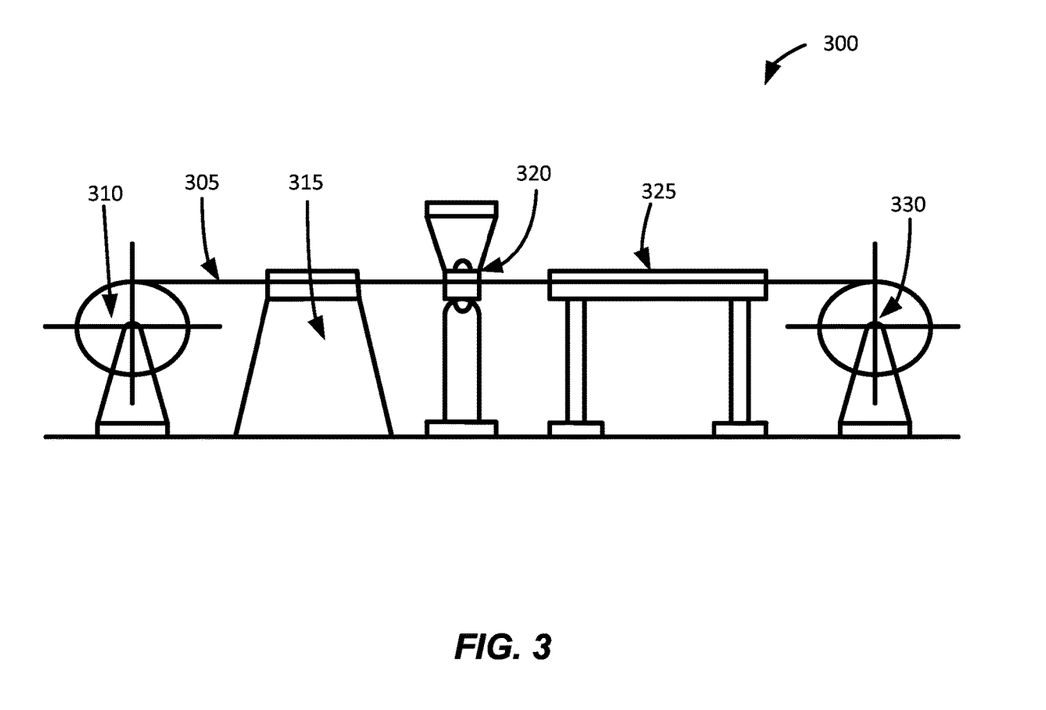
FIG. 3 is a schematic diagram of an example system that may be utilized to form extruded insulation on magnet wire, according to an illustrative embodiment of the disclosure.

1-2D. A schematic diagram of one example system 300 for forming extruded insulation from a polymeric blend is illustrated in FIG. 3. The system 300 may include a wide variety of components that facilitate processing a magnet wire 305. As shown, the system 300 may include a pay-off 310, a preheater 315, an extruder 320, a cooling trough 325, and a take-off 330. Each of these components, as well as other components that may optionally be incorporated into the system 300, are described in greater detail below.

With reference to FIG. 3, a suitable pay-off 310 may provide a magnet wire 305 to components of the system 300 configured to form extruded insulation. In certain embodiments, the pay-off 310 may provide magnet wire 305 having desired dimensions (e.g., a desired cross-sectional shape, a desired diameter, a desired width and thickness, etc.). As desired, base insulation may also be formed on the magnet wire 305 prior to the pay-off 310 providing the magnet wire 305. In other embodiments, the pay-off 310 may provide input material to one or more components configured to form a conductor having desired dimensions and/or to one or more components configured to form base insulation.

As desired, the system 300 may include one or more wire forming devices or components configured to receive input material (e.g., rod stock, etc.) and process the received input material to form a conductor with desired dimensions. For example, input material may be processed by a suitable rod breakdown device or rod mill that draws or pulls input material through one or more dies that reduce the size of the input material to desired dimensions. As desired, one or more flatteners and/or rollers may be used to modify the cross-sectional shape of the input material (e.g., to form rectangular wire). As another example, input material may be processed by a suitable conform device or system that forms a conductor with desired dimensions. As yet another example, a conductor may be formed via a 3D printing or additive manufacturing process.

In certain embodiments, the system 300 may include one or more components or subsystems configured to form base insulation on the magnet wire 305 prior to the formation of extruded insulation. For example, the system 300 may include one or more enamel formation components, such as a varnish application system (e.g., an application die, etc.) and one or more curing devices (e.g., an enameling oven, an ultraviolet curing system, etc.) configured to form any suitable number of enamel layers on the magnet wire 305. Other suitable base insulation formation components may be incorporated into the system 300 as desired.

With continued reference to FIG. 3, the system 300 may include one or more components configured to control the temperature of magnet wire 305 prior to the application of extruded insulation. For example, the magnet wire 305 may be passed through one or more preheaters 320 in order to attain a desired temperature prior to an extrusion process. A preheater 315 may include any suitable components configured to increase or raise the temperature of the magnet wire 305, such as one or more heating coils, heaters, ovens, etc. As necessary, one or more cooling devices may also be utilized. The temperature of the magnet wire 305 may be adjusted or controlled to achieve a wide variety of suitable values prior to extrusion. For example, in certain embodiments, the temperature may be controlled to approximately 200° C. or greater prior to extrusion. As another example, temperature may be controlled to approximately 400° F. or greater prior to extrusion. Controlling or maintaining the temperature at this level may facilitate adhesion between the extruded thermoplastic layer and the underling conductor or base insulation.

One or more suitable extruders 320 or extrusion devices may be configured to receive the magnet wire 305 and extrude thermoplastic insulation on the magnet wire 305. According to an aspect of the disclosure, the extruder(s) 320 may be configured to extrude a polymeric blend. In certain embodiments, an extruder 320 may be a single screw or a multi-screw (e.g., dual screw, etc.) extruder configured to receive input material and process (e.g., mix, increase the temperature, increase the pressure, etc.) the input material prior to extrusion onto the magnet wire 305 by any number of suitable extrusion heads and/or other devices configured to apply a desired amount of thermoplastic insulation. As desired, the flow rates of the extruded insulation may be controlled in order to obtain a desired thickness. Additionally, in certain embodiments, one or more extrusion dies may be utilized to control the thickness and/or shape of the extruded insulation.

With continued reference to FIG. 3, the system 300 may include any suitable devices configured to control the temperature of the magnet wire 305 following the extrusion process. In certain embodiments, the extruded insulation may be heated following extrusion. Additionally, in certain embodiments, the process of cooling the extruded insulation prior to taking up the finished magnet wire may be controlled. As a result of controlling the cooling rate of the extruded insulation, desirable characteristics (e.g., a desired crystallinity, etc.) may be achieved. Cooling devices may include any suitable devices and/or systems configured to lower the temperature of the finished magnet wire prior to take-up (or subsequent processing). In certain embodiments, the cooling devices may include a cooling trough 325, quencher, or liquid bath (e.g., a water bath) through which the magnet wire 305 may be passed in order to cool. The temperature of the liquid in the bath may be controlled via recycling liquid. Additionally, the cooling rate may be controlled as a function of controlling the liquid temperature and/or establishing a desired length of the cooling trough 325.

Following cooling of the extruded insulation, the finished magnet wire 305 may be provided to one or more suitable take-offs 330, accumulators, or take-up devices. These devices may, for example, apply tension to the magnet wire 305, bundle the wire 305, and/or wind the finished wire 305 onto a spool. In other embodiments, the magnet wire 305 may be provided to one or more downstream devices or components prior to take-off. For example, the magnet wire 305 may be provided to one or more components configured to form additional insulation on the magnet wire 305, such as a subsystem configured to form additional extruded insulation or a subsystem configured to form a conformal insulation layer (e.g., a parylene layer, etc.) on the magnet wire 305. As another example, the magnet wire 305 may be provided to one or more components configured to form one or more articles from the magnet wire 305, such as hairpins or coils that may be incorporated into a motor or other electrical appliance.

In certain embodiments, formation of extruded insulation may be formed in a tandem or inline manner with one or more other processes. For example, formation of extruded insulation may be formed in a tandem manner with wire drawing or conductor formation and/or with the formation of one or more base insulation layers. In other embodiments, the magnet wire 105 may be taken up at any suitable steps within the overall process and subsequently provided to another component or subsystem.

Additionally, any suitable number of motors, flyers, capstans, and/or load cells may be incorporated into the system 300 to control passage of magnet wire 305 through the system 300. Any suitable number of controllers (e.g., control units, computers, microcontrollers, etc.) may be configured to control various components of the system 300. For example, one or more controllers may facilitate synchronization of motors and/or line speeds within the system 300. As desired, a controller and/or combination of controllers may additionally control a wide variety of other parameters, such as the flow rate of an applied varnish, the temperature of an enameling oven, the temperature of various heating/cooling devices, the flow rate of an extrusion device, the temperature of liquid included in a quencher, and/or various testing conducted on the magnet wire 305. Each controller may be a separate component or, alternatively, incorporated into another device or component. Additionally, any number of suitable communications channels (e.g., wired communications channels, wireless communications channels, etc.) may facilitate communication between a controller and one or more other components (e.g., one or more motors, another controller, other devices, etc.).

The system 300 described above with reference to FIG. 3 is provided by way of example only. A wide variety of other suitable systems may be utilized to form a magnet wire that includes at least one layer of extruded insulation formed from a polymeric blend. These systems may include more or less components than the system 300 of FIG. 3. Additionally, these systems may include certain alternative components to the system 300 of FIG. 3, which is provided by way of non-limiting example only. Indeed, the present disclosure envisions a wide variety of suitable systems that may be utilized to form magnet wire.

Figure 4:
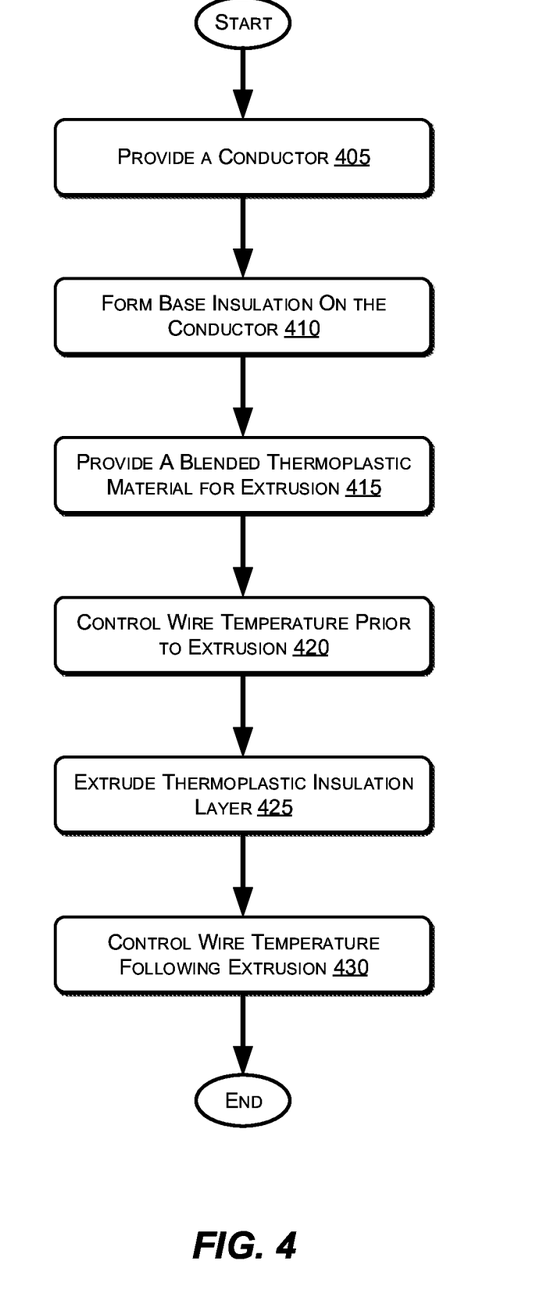
FIG. 4 is a flowchart depicting an example method for forming magnet wire that includes at least one extruded insulation layer, according to an illustrative embodiment of the disclosure.

FIG. 4 is a flowchart depicting an example method 400 for forming magnet wire that includes at least one extruded insulation layer, according to an illustrative embodiment of the disclosure. The method 400 may be performed utilizing a wide variety of suitable systems and/or devices. For example, a portion of the method 400 may be performed by the system 300 of FIG. 3. The method 400 may begin at block 405, and a conductor may be provided. In certain embodiments, a preformed conductor having desired dimensions may be provided. In other embodiments, input material may be provided and processed in order to form a conductor having desired dimensions. For example, input material may be processed by a rod mill, flatteners, and/or rollers in order to provide a conductor having desired dimensions.

At block 410, which is optional in certain embodiments, base insulation may be formed on the conductor. A wide variety of suitable base insulation and/or combinations of different types of base insulation may be formed as desired. For example, one or more enamel layers may be formed. In certain embodiments, one or more layers of polyamideimide and/or polyimide enamel may be formed as base insulation. As another example, one or more semi-conductive layers may be formed. As yet another example, one or more layers of extruded insulation, such as extruded insulation that does not include a polymeric blend, may be formed as base insulation.

At block 415, a blended thermoplastic material or a polymeric blend may be provided for extrusion. As set forth herein, a wide variety of suitable polymeric blends may be provided. A polymeric blend may include two or more polymeric materials blended or mixed at any suitable blend rate. For example, a polymeric blend may include a suitable combination of polyetheretherketone ("PEEK"), polyetherketoneketone ("PEKK"), polyaryletherketone ("PAEK"), polyetherimide ("PEI"), polyphenylsulfone ("PPSU"), polyethersulfone ("PESU"), polypheylene sulfide ("PPS"), polybenzimidazole ("PBI"), polycarbonate, one or more polyesters (e.g., polyethylene terephthalate ("PET"), etc.), one or more copolyesters, polyamide, and/or thermoplastic polyimide ("TPI"). In certain embodiments, a polymeric blend may include a suitable combination of at least three polymeric materials. For example, a blend may include PEEK, PPSU, and PESU. As another example, a blend may include a first polymeric material having a thermal index above 250° C., a second polymeric material having a thermal index below 200° C., and third polymeric material having a thermal index below 200° C. In certain embodiments, a blend may be formed without any compatibilizers. In other embodiments, one or more compatibilizers may be added to a blend. A wide variety of fillers, and/or other suitable additives may be incorporated into a polymeric blend as desired in various embodiments.

At block 420, the temperature of the conductor or wire having base insulation may be controlled prior to extrusion. For example, one or more suitable preheaters or other devices may be utilized to control a pre-extrusion temperature. A thermoplastic insulation layer may formed at block 425 by extruding the polymeric blend on the conductor or wire. Any suitable extrusion devices may be utilized to extrude the thermoplastic insulation layer. The temperature of the magnet wire and extruded insulation may then be controlled at block 430 following extrusion. For example, a cooling trough and/or other suitable components may be utilized to cool the magnet wire following extrusion.

In certain embodiments, the method 400 may end following block 430. In other embodiments, one or more additional operations may be performed. For example, in certain embodiments, one or more additional insulation layers (e.g., another extruded layer, a conformal layer, etc.) may be formed on the magnet wire. As another example, the magnet wire may be formed into one or more articles (e.g., coils, hairpins, etc.) that may be incorporated into an electrical appliance. The method 400 may then end following the additional operations.

The operations described and shown in the method 400 of FIG. 4 may be carried out or performed in any suitable order as desired in various embodiments. Additionally, in certain embodiments, at least a portion of the operations may be carried out in parallel. Furthermore, in certain embodiments, less than or more than the operations described in FIG. 4 may be performed.

EXAMPLES

As set forth above, a wide variety of suitable polymeric blends may be utilized to form extruded magnet wire insulation. The examples set forth below in Tables 1 and 2 are intended as illustrative and non-limiting, and represent specific embodiments of the present disclosure in which various polymeric blends are utilized to form magnet wire insulation. For consistency, the wire samples discussed in the examples were all prepared as rectangular wire having a conductor width of approximately 3.384 mm and a conductor thickness of approximately 1.834 mm with a tolerance of +/−0.015 mm. The conductors were formed from oxygen free copper. Additionally, base insulation was formed from polyamideimide ("PAI"). In other embodiments, conductors may be formed with different dimensions. Additionally, other base insulation such as polyimide enamel may be utilized as desired. In other embodiments, a polymeric blend may be extruded directly on a conductor.

With reference to Tables 1 and 2, various polymeric blend formulations are provided. For each polymeric blend, weight percentages of polymeric materials utilized to form the relevant polymeric blend are provided. Additionally, control samples of extruded single material, PEEK, PPSU (e.g., Radel 5800), and PEI (e.g. Ultem 1000) are provided for comparison to the polymeric blends. For each type of extruded insulation material, a thickness of the extruded layer is provided. Additionally, measured performance criteria for the extruded samples are provided. First, measured PDIV values at different temperatures (e.g., 25° C. and 150° C.) are provided. Measured PDIV values after the wire samples have been subjected to temperatures of 190° C. for 1000 hours are also provided. Measured PDIV values after the wire samples have been subjected to 1500 cycles of approximately 24 minutes each in which the temperature is alternated between −40° C. and 150° C. are also provided. Dielectric breakdown values taken for both a shotbox test and a foil test are also provided. In a shotbox test, a magnet wire is submerged in shot balls and tested until failure. In a foil test, a metal foil is wrapped around a magnet wire, and the wire is tested until failure. With continued reference to Tables 1 and 2, an elongation to break percentage is provided for each wire sample. Cut through temperatures are also provided. Further, each wire sample was found to satisfy several industry standard tests, such as flexibility tests, heat shock tests, bend tests, and oil resistance tests.

TABLE 1

| Formulation | PESU 90 PPSU 10 | PESU 50 PPSU 50 | PESU 70 PPSU 30 | PEI 90 PEEK 10 | PEI 70 PEEK 30 | PEEK |
|---|---|---|---|---|---|---|
| Thickness (μm) | 210 | 195 | 180 | 203 | 194 | 182 |
| PDIV Vp 25° C. | 1928 | 1923 | 1725 | 1589 | 1489 | 1201 |
| PDIV Vp 150° C. | 1626 | 1617 | 1645 | 1645 | 1388 | 1032 |
| PDIV 1000 hours 190° C. | 2007 | 1843 | 1720 | 1965 | 1692 | 1125 |
| PDIV 1500 cycles −40°/150° C. | 1890 | 1979 | 1695 | 1989 | 1772 | 1175 |
| DB Shotbox Volts | 11826 | 15402 | 14756 | 15156 | 13314 | 11734 |
| DB Foil Volts | 16767 | 17142 | 17585 | 16845 | 15245 | 12968 |
| Elongation % | 41 | 42 | 41 | 41 | 39 | 42 |
| Cut Through (° C.) | 390 | 379 | 397 | 379 | 370 | 411 |
| Flexibility 25% | Pass | Pass | Pass | Pass | Pass | Pass |
| Flexibility 0-90° | Pass | Pass | Pass | Pass | Pass | Pass |
| Flexibility 0-300° | Pass | Pass | Pass | Pass | Pass | Pass |
| Heat Shock 10% Elong. 220° 1 hour | Pass | Pass | Pass | Pass | Pass | Pass |
| Heat Shock 175° 0.5 hrs | Pass | Pass | Pass | Pass | Pass | Pass |
| Bend/190° 1000 hours | Pass | Pass | Pass | Pass | Pass | Pass |
| Oil Resist. 150° ATF 0.2% Water | Pass | Pass | Pass | Pass | Pass | Pass |

TABLE 2

| Formulation | PPSU 70 PEI 30 | PPSU 50 PEI 50 | PPSU 70 PEEK 30 | PEEK 50 PPSU 50 | PEI | PPSU | PEEK 30 PPSU 50 PESU 20 |
|---|---|---|---|---|---|---|---|
| Thickness (μm) | 196 | 196 | 196 | 182 | 162 | 177 | 215 |
| PDIV Vp 25° C. | 1801 | 1890 | 1862 | 1781 | 1513 | 1764 | 2062 |
| PDIV Vp 150° C. | 1617 | 1725 | 1664 | 1442 | 1513 | 1343 | 2069 |
| PDIV 1000 hours 190° C. | 1914 | 2046 | 1923 | 1170 | 2027 | 1791 | 2052 |
| PDIV 1500 cycles −40°/150° C. | 1895 | 2017 | 2003 | 1229 | 2017 | 1951 | 2007 |

TABLE 2-continued

| Formulation | PPSU 70 PEI 30 | PPSU 50 PEI 50 | PPSU 70 PEEK 30 | PEEK 50 PPSU 50 | PEI | PPSU | PEEK 30 PPSU 50 PESU 20 |
|---|---|---|---|---|---|---|---|
| DB Shotbox Volts | 12872 | 16248 | 16812 | 14782 | 16046 | 12636 | 22500 |
| DB Foil Volts | 19267 | 18115 | 17735 | 16515 | 15732 | 14357 | 22527 |
| Elongation % | 40 | 42 | 42 | 42 | 42 | 37 | 43.7 |
| Cut Through (° C.) | 383 | 377 | 372 | 406 | 392 | 414 | 370 |
| Flexibility 25% | Pass | Pass | Pass | Pass | Pass | Pass | Pass |
| Flexibility 0-90° | Pass | Pass | Pass | Pass | Pass | Pass | Pass |
| Flexibility 0-300° | Pass | Pass | Pass | Pass | Pass | Pass | Pass |
| Heat Shock 10% Elong. 220° 1 hour | Pass | Pass | Pass | Pass | Pass | Pass | Pass |
| Heat Shock 175° 0.5 hrs | Pass | Pass | Pass | Pass | Pass | Pass | Pass |
| Bend/190° 1000 hours | Pass | Pass | Pass | Pass | Pass | Pass | Pass |
| Oil Resist. 150° ATF 0.2% Water | Pass | Pass | Pass | Pass | Pass | Pass | Pass |

As shown in Tables 1 and 2, certain polymeric blends may provide similar or better performance than conventional single polymer extruded materials (e.g., PEEK, PPSU, PEI, etc.). For example, certain polymeric blends may provide enhanced PDIV and/or dielectric breakdown performance. Additionally, certain polymeric blends may be cheaper to manufacture or produce than conventional single polymer materials.

Of particular note, a triple blend that includes a combination of PEEK as a first polymeric material, PPSU as a second polymeric material, and PESU as a third polymeric exhibited excellent performance. This triple blend was formed with approximately thirty percent (30%) by weight of PEEK, approximately fifty percent (50%) by weight of PPSU, and approximately twenty percent (20%) by weight of PESU. Additionally, the blend was found to have particularly excellent PDIV and dielectric breakdown values. Further, the blend was found to have enhanced adhesion to the underlying base insulation than insulation formed solely from PEEK.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A magnet wire comprising:
   a conductor; and
   insulation formed around the conductor, the insulation comprising at least one layer of extruded insulation comprising a blend of:
   a first polymeric material comprising polyetheretherketone, wherein the first polymeric material comprises no more than forty percent by weight of the blend;
   a second polymeric material comprising polyphenylsulfone; and
   a third polymeric material comprising polyethersulfone.

2. The magnet wire of claim 1, wherein:
   the first polymeric material comprises between twenty percent and forty percent by weight of the blend;
   the second polymeric material comprises between thirty percent and seventy percent by weight of the blend; and
   the third polymeric material comprises between ten percent and forty percent by weight of the blend.

3. The magnet wire of claim 1, wherein:
   the first polymeric material comprises between twenty-five percent and thirty-five percent by weight of the blend;
   the second polymeric material comprises between forty-five percent and fifty-five percent by weight of the blend; and
   the third polymeric material comprises between fifteen percent and twenty-five percent by weight of the blend.

4. The magnet wire of claim 1, wherein the extruded insulation has a thickness between 51 microns and 610 microns.

5. The magnet wire of claim 1, wherein the blend further comprises a compatibilizer.

6. The magnet wire of claim 1, wherein the blend further comprises a filler material.

7. The magnet wire of claim 6, wherein the filler material comprises at least one of titanium(IV) oxide, boron nitride, silica dioxide, or chromium(III) oxide.

8. The magnet wire of claim 1, wherein the extruded insulation is formed directly on the conductor.

9. The magnet wire of claim 1, wherein the insulation further comprises:
   base insulation formed around the conductor, wherein the extruded insulation is formed around the base insulation.

10. The magnet wire of claim 9, wherein the base insulation comprises at least one layer of polymeric enamel.

11. The magnet wire of claim 10, wherein the at least one layer of enamel comprises one of polyimide or polyamide-imide.

12. The magnet wire of claim 1, wherein the insulation comprises a partial discharge inception voltage at 25° C. of at least 1900 volts.

13. A magnet wire comprising:
   a conductor; and
   insulation formed around the conductor, the insulation comprising at least one layer of extruded insulation comprising a blend of:
      a first polymeric material having a thermal index greater than 250° C., wherein the first polymeric material comprises no more than forty percent by weight of the blend;
      a second polymeric material having a thermal index below 200° C.; and
      a third polymeric material different than the second polymeric material and having a thermal index below 200° C.

14. The magnet wire of claim 13, wherein the first polymeric material comprises at least one of polyetheretherketone, polyaryletherketone, or polyetherketoneketone.

15. The magnet wire of claim 13, wherein the first polymeric material comprises polyetheretherketone.

16. The magnet wire of claim 13, wherein the second polymeric material comprises polyphenylsulfone and the third polymeric material comprises polyethersulfone.

17. The magnet wire of claim 13, wherein:
   the first polymeric material comprises between twenty percent and forty percent by weight of the blend;
   the second polymeric material comprises between thirty percent and seventy percent by weight of the blend; and
   the third polymeric material comprises between ten percent and forty percent by weight of the blend.

18. The magnet wire of claim 13, wherein:
   the first polymeric material comprises between twenty-five percent and thirty-five percent by weight of the blend;
   the second polymeric material comprises between forty-five percent and fifty-five percent by weight of the blend; and
   the third polymeric material comprises between fifteen percent and twenty-five percent by weight of the blend.

19. The magnet wire of claim 13, wherein the extruded insulation has a thickness between 51 microns and 610 microns.

20. The magnet wire of claim 13, wherein the blend further comprises a compatibilizer.

21. The magnet wire of claim 13, wherein the blend further comprises a filler material, the filler material comprising at least one of titanium(IV) oxide, boron nitride, silica dioxide, or chromium(III) oxide.

22. The magnet wire of claim 13, wherein the extruded insulation is formed directly on the conductor.

23. The magnet wire of claim 13, wherein the insulation further comprises:
   base insulation formed around the conductor, wherein the extruded insulation is formed around the base insulation.

24. The magnet wire of claim 23, wherein the base insulation comprises at least one layer of polymeric enamel.

25. The magnet wire of claim 13, wherein the insulation comprises a partial discharge inception voltage at 25° C. of at least 1900 volts.

\* \* \* \* \*